(12) United States Patent
Hatch et al.

(10) Patent No.: US 11,087,267 B1
(45) Date of Patent: Aug. 10, 2021

(54) CONFIGURABLE VEHICLE

(71) Applicant: Wells Fargo Bank, N.A., San Francisco, CA (US)

(72) Inventors: David C. Hatch, Pacifica, CA (US); Muhammad Farukh Munir, Pittsburg, CA (US); Aaron Francis Colfax Petrik, San Francisco, CA (US); Darrell L. Suen, San Ramon, CA (US); Suzanne M Fisi, Clayton, CA (US); Ryan James Wyler, Gilbert, AZ (US); Nancy B. Zimmerman, Fairfax, CA (US); Simone Olivia Harvey, Berkeley, CA (US); Timothy Roger Ward, Mesa, AZ (US); Steven J. Wirt, Oakland, CA (US); Jennifer Lynn Semien Copeland, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 540 days.

(21) Appl. No.: 15/485,869

(22) Filed: Apr. 12, 2017

(51) Int. Cl.
*G06Q 10/08* (2012.01)
*B60P 3/42* (2006.01)

(52) U.S. Cl.
CPC .......... *G06Q 10/0832* (2013.01); *B60P 3/423* (2013.01)

(58) Field of Classification Search
CPC ............................. G06Q 10/0832; B60P 3/423
USPC ........................................................ 705/13
See application file for complete search history.

(56) References Cited

U.S. PATENT DOCUMENTS

| | | |
|---|---|---|
| 5,301,997 A | 4/1994 | Cudden |
| 6,896,319 B1 | 5/2005 | Huang et al. |
| 7,222,905 B2 | 5/2007 | Jaeck |
| 7,774,217 B1 | 8/2010 | Yager et al. |
| 8,255,275 B2 | 8/2012 | Collopy et al. |
| 8,437,919 B2 | 5/2013 | Wang et al. |
| 8,496,106 B1 | 7/2013 | Bigg |
| 8,595,037 B1 | 11/2013 | Hyde et al. |
| 8,694,328 B1 | 4/2014 | Gormley |
| 8,727,439 B2 | 5/2014 | Herzberg |
| 9,002,568 B2 | 4/2015 | Datta et al. |
| 9,141,996 B2 | 9/2015 | Christensen et al. |
| 9,248,794 B2 | 2/2016 | Chang et al. |
| 9,284,007 B2 | 3/2016 | Belenkov et al. |
| 9,340,126 B2 | 5/2016 | Cuddihy et al. |
| 9,376,211 B2 | 6/2016 | Schliwa et al. |

(Continued)

OTHER PUBLICATIONS

Torchinsky, Jason; "There Should Be Modular Cars That Can Do Anything"; Mar. 6, 2015. (Year: 2015).*

(Continued)

*Primary Examiner* — George Chen
*Assistant Examiner* — Dione N. Simpson
(74) *Attorney, Agent, or Firm* — Merchant & Gould P.C.

(57) ABSTRACT

A modular vehicle system includes a plurality of vehicle modules with at least one autonomous vehicle module. A request from a user located at a user location specifies a plurality of the vehicle modules. The user location is specified, and a module location is determined for each of the specified vehicle modules. Based on the request, the specified modules are retrieved from the module locations, and assembled into a configured vehicle. The configured vehicle is located at a dispatch location. The configured vehicle is then dispatched from the dispatch location to the user location.

9 Claims, 10 Drawing Sheets

(56) References Cited

U.S. PATENT DOCUMENTS

| | | | |
|---|---|---|---|
| 9,440,605 | B2 | 9/2016 | Vadgama et al. |
| 9,459,622 | B2 | 10/2016 | Abhyanker |
| 10,233,021 | B1* | 3/2019 | Brady .................. G05D 1/0282 |
| 2005/0071373 | A1* | 3/2005 | Long ....................... G06Q 50/30 |
| 2005/0187833 | A1* | 8/2005 | Royer .................. G06Q 10/087 |
| | | | 705/28 |
| 2005/0230934 | A1 | 10/2005 | Wilt |
| 2007/0156442 | A1 | 7/2007 | Ali |
| 2007/0156540 | A1* | 7/2007 | Koren ................ G06Q 30/0643 |
| | | | 705/14.51 |
| 2007/0221430 | A1 | 9/2007 | Allison, Sr. |
| 2008/0306652 | A1 | 12/2008 | Boger et al. |
| 2011/0022545 | A1 | 1/2011 | Durney |
| 2011/0046836 | A1 | 2/2011 | Anderson |
| 2011/0155803 | A1 | 6/2011 | Nieuwland et al. |
| 2012/0004933 | A1 | 1/2012 | Foladare et al. |
| 2012/0153087 | A1 | 6/2012 | Collette et al. |
| 2012/0197669 | A1 | 8/2012 | Kote et al. |
| 2014/0117721 | A1 | 5/2014 | Ring et al. |
| 2014/0262583 | A1 | 9/2014 | Url |
| 2015/0088337 | A1 | 3/2015 | Toohy et al. |
| 2015/0136623 | A1 | 5/2015 | Gooden |
| 2015/0158486 | A1 | 6/2015 | Healey et al. |
| 2015/0185034 | A1 | 7/2015 | Abhyanker |
| 2015/0237791 | A1 | 8/2015 | Bassett et al. |
| 2015/0375685 | A1 | 12/2015 | Krishnan et al. |
| 2016/0045833 | A1 | 2/2016 | Boyle |
| 2016/0189304 | A1 | 6/2016 | Todasco et al. |
| 2017/0068245 | A1* | 3/2017 | Scofield ............... G08G 1/0112 |
| 2017/0197679 | A1* | 7/2017 | Scaringe .............. B60K 17/354 |
| 2017/0344355 | A1* | 11/2017 | Sarkar ........................ G06F 8/65 |
| 2018/0186274 | A1* | 7/2018 | Gurin ....................... B60P 3/423 |
| 2020/0058092 | A1* | 2/2020 | Buttolo .............. G06Q 10/0834 |

OTHER PUBLICATIONS

Tully, Jim et al., "Internet of Things Primer for 2016," Mar. 31, 2016, 8 pages.

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al, "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

Aurell et al.; Vehicle Combinations Based on the Modular Concept; Jan. 2007; pp. 1-64.

Karapiperis et al.; Usage-Based Insurance and Vehicle Telematics: Insurance Market and Regulatory Implications; Mar. 2015; 86 pages.

* cited by examiner

FIG. 4
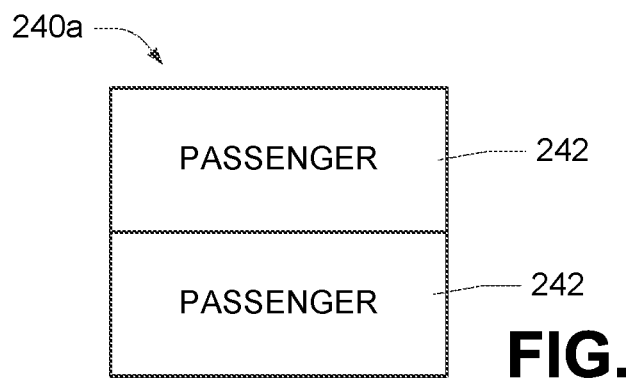
FIG. 5
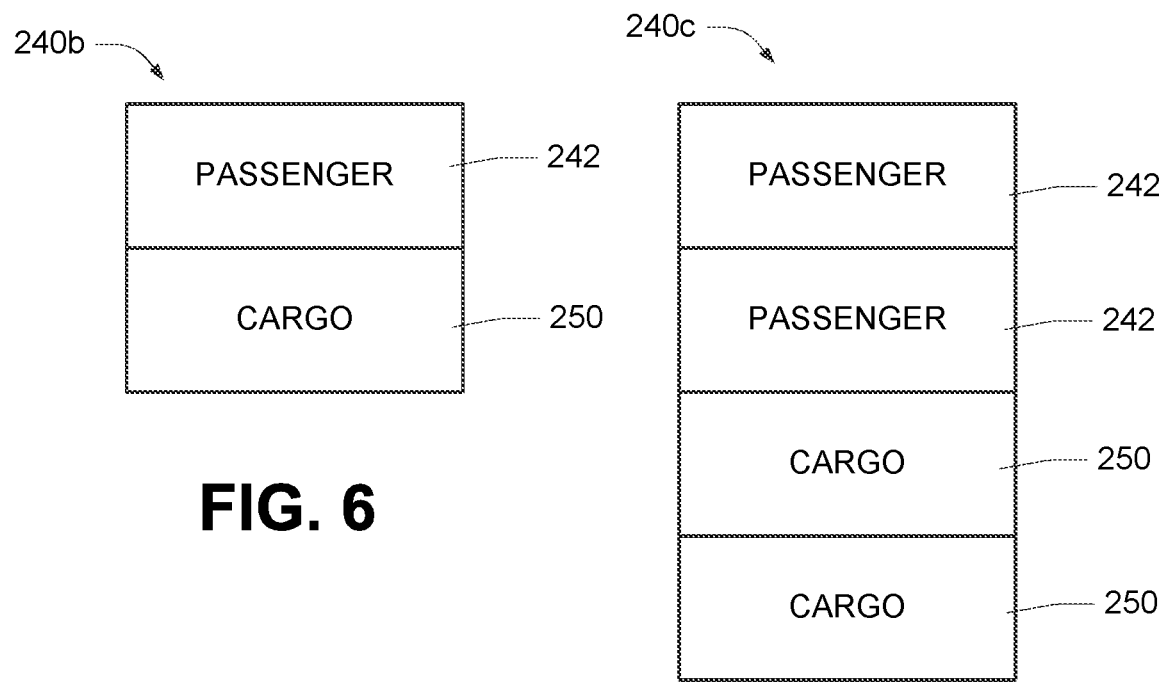
FIG. 6
FIG. 7

CONFIGURABLE VEHICLE

BACKGROUND

Various vehicles are commonly used for various transportation needs such as moving people and cargo to and from desired destinations. While owning a personal vehicle may be convenient for individuals, vehicle sharing arrangements where individuals share a fleet of vehicles can be more economical. Moreover, such vehicle sharing arrangements could include traditional vehicles operated by a driver, and/or autonomous vehicles.

An autonomous vehicle is a vehicle that can detect its surroundings and navigate with little or no human input. Techniques such as radar, a global positioning system (GPS) and computer vision can be used to navigate the autonomous vehicle.

SUMMARY

In accordance with certain aspects of the present disclosure, a modular vehicle system, includes a plurality of vehicle modules with at least one autonomous vehicle module. A computing system includes a processor and a memory accessible by the processor. The memory stores program instructions that configure the processor to generate a user interface and receive a request from a user located at a user location via the user interface. The request specifies a plurality of the vehicle modules. The user location is specified, and a module location is determined for each of the specified vehicle modules. Based on the request, the processor is configured to output configuration instructions for retrieving the specified modules from the module locations, and assemble the specified modules into a configured vehicle. The configured vehicle is located at a dispatch location. The configured vehicle is then dispatched from the dispatch location to the user location.

DESCRIPTION OF THE DRAWINGS

FIG. 4 conceptually illustrates an example of a vehicle module of the system shown in FIG. 1.

FIG. 5 conceptually illustrates an example of a configured vehicle including two passenger modules.

FIG. 6 conceptually illustrates an example of configured vehicle including a passenger module and a cargo module.

FIG. 7 conceptually illustrates an example of configured vehicle including multiple passenger modules and a cargo modules.

DETAILED DESCRIPTION

Figure 1:
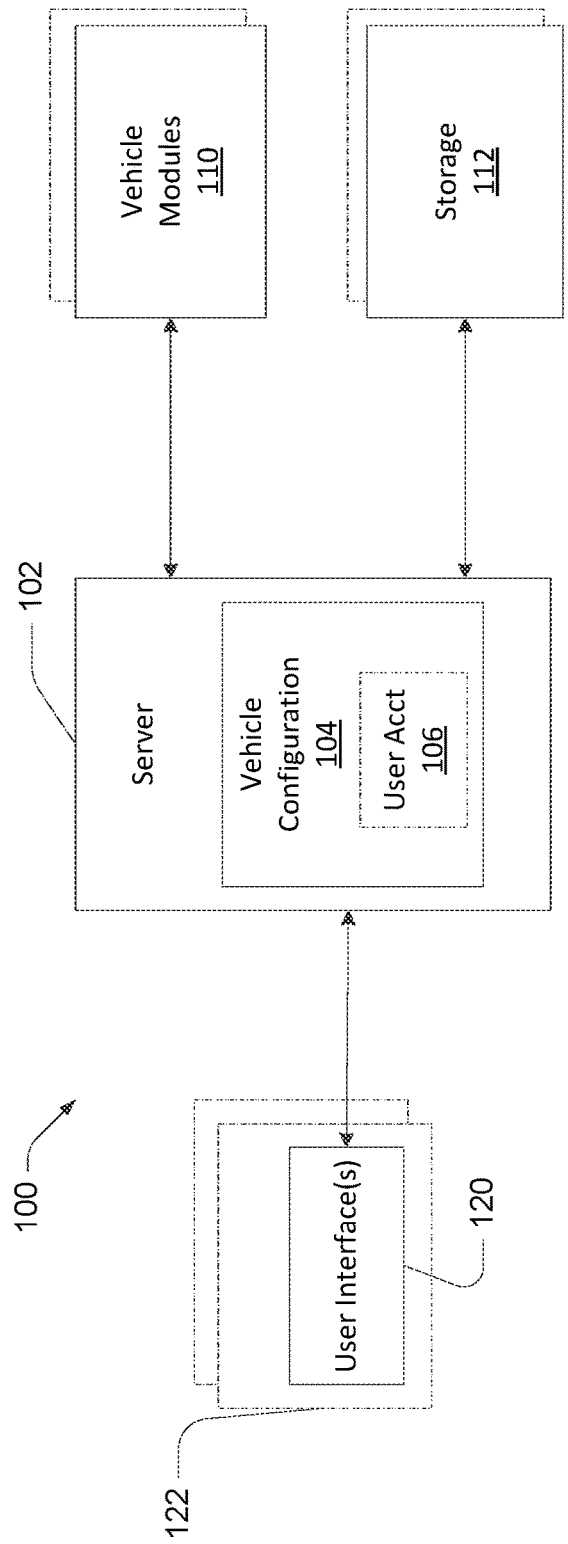
FIG. 1 is a block diagram illustrating an example of a modular vehicle configuration system in accordance with aspects of the present disclosure.

In the following Detailed Description, reference is made to the accompanying drawings, which form a part hereof, and in which is shown by way of illustration specific embodiments in which the invention may be practiced. The following detailed description, therefore, is not to be taken in a limiting sense.

Individually owned and operated vehicles provide convenient means for transporting passengers and cargo. However, in some situations, space for storing such vehicles is not available or convenient. Public transportation is also not always a viable option for moving a group of people or transporting personal or business cargo. Vehicle sharing or rental arrangements do not necessarily require individuals to provide storage space for such vehicles. Through such vehicle sharing systems, individuals gain the benefits of private vehicles without the costs and responsibilities of ownership. Instead, users access a fleet of vehicles on an as-needed basis.

For example, car sharing arrangements allow individuals to rent vehicles for short periods of time, often by the hour. They are attractive to customers who make only occasional use of a vehicle, as well as others who would like occasional access to different types of vehicles. For instance, if someone needs to transport cargo only occasionally, it might not be practical to own and store a cargo truck. The organization renting the vehicles may be a commercial business or the vehicles users may be organized as a company, public agency, cooperative, ad hoc grouping, etc. Such vehicle sharing arrangements can help reduce congestion and pollution, reduce the demand for public and private parking spaces, etc.

In some vehicle sharing systems, users are registered as members and a payment mechanism is established in advance. The registration process may further include pre-approving members to drive. This includes performing driving background checks of perspective users to assess driving records, traffic violations, etc. Further, individual members may be required to provide insurance meeting state insurance requirements.

In other vehicle sharing systems, the fleet of shared vehicles includes autonomous vehicles. As used herein, an autonomous vehicle refers to a vehicle that can detect its surroundings and navigate with little or no human input. Techniques such as radar, a global positioning system (GPS) and computer vision can be used to navigate the autonomous vehicle. If vehicle sharing members use such autonomous vehicles, it may not necessary to perform such driver background checks, or for users to provide insurance since they do not actually drive the vehicles.

It can be difficult for a shared fleet of vehicles to have the desired types of vehicles available for users at desired times. For example, if at a given time only large multi-passenger vehicles are available, it is not economic for a user who only needs to transport only him or herself. Some vehicle sharing systems disclosed herein provide increased flexibility for fleets of autonomous vehicles provided for situations such as vehicle sharing.

Systems disclosed herein provide, for example, modular autonomous cars that are re-configured for each ride. In one example, a user requests a vehicle. The vehicle is configured based on the user's specific needs, such as the number of passengers, desired activities, cargo hauling needs, etc.). Once configured, the configured vehicle arrives for the user automatically. Vehicles may be shared in pools, and personalized before being dispatched to the user. In some versions, a removable personal items module holds personal items for the rider. When a vehicle is requested by the user, the personal storage module is retrieved and installed into the requested vehicle, then the vehicle is dispatched to pick up the user. In this manner, the user can access the items personal in the module, such as sunglasses, food, etc.

Thus, examples of vehicle systems disclosed herein provide a standard fleet of autonomous vehicles that can be personalized in real time based on customer needs. This is especially useful for individuals who don't have space to store a vehicle, personal items associated with a vehicle, or even business supplies. Instead, all of these things are centrally stored or provided. Vehicle modules are provided that allows configuring vehicles base on, for example, the number of people to be transported, cargo requirements, personal item storage, etc. A user can request a specified vehicle using a computer application. Based on the user specifications, the vehicle is configured, personal items and supplies are loaded, and the vehicle is dispatched to the user. Some implementations further include centralized parking facilities so users are not required to park the vehicle once they have reached their destination.

FIG. 1 illustrates an example modular vehicle system 100 that includes a fleet of vehicle modules 110. In the illustrated example, the vehicle modules 110 include at least one autonomous vehicle module, which is discussed further below. A computer system 102, such as a server computer, includes a processor and a memory accessible by the processor storing program instructions that configure the computer 102 to implement a vehicle configuration system 104. In some examples, the server 102 can be one of a network of servers (e.g., a "cloud") of the system 100. Further, each server in the network of servers can be adapted to perform a specific function or functions on behalf of the system 100. Although specific functionalities will be attributed to the server 102 in this disclosure, it should be appreciated that the same functionalities can be divided among a network of interconnected servers. Thus, throughout this disclosure, the server 102 can alternatively be understood as a single server or a network of servers.

One or more user interfaces 120 are configured to display and receive vehicle configuration information from a user requesting a vehicle. The user interface 120 could be implemented on a user computer 122, which could be any of a number of suitable devices such as a desktop computer, laptop computer, tablet device, smart phone, etc. that communicates with the server 102, for example, via a network such as the internet. One or more storage 112 facilities are also in communication with the server 102, and store user personal items, equipment, supplies, inventory, etc. as will be described further below.

Figure 2:
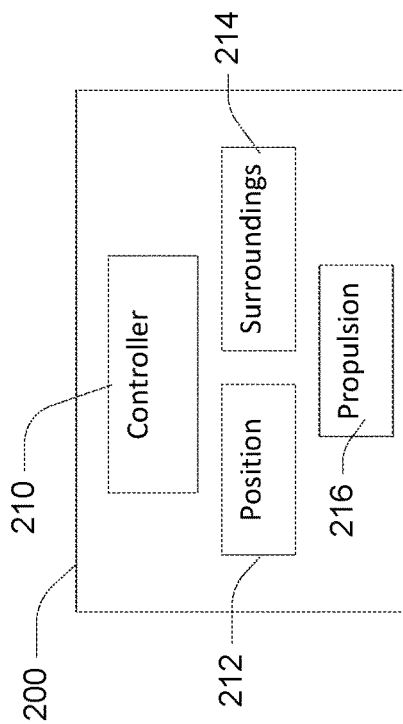
FIG. 2 is a block diagram conceptually illustrating aspects of an example of an autonomous vehicle.

The vehicle modules 110 include autonomous vehicles that are operated with little or no input from a human driver. FIG. 2 is a block diagram illustrating aspects of an example autonomous vehicle 200, which includes a vehicle controller 210 that operates the autonomous vehicle. The example autonomous vehicle 200 is a self-driving vehicle, for example a self-driving car. The controller 210 provides instructions in the form of control signals (such as driving and stopping signals) to the appropriate components of the autonomous vehicle 200. The vehicle controller 210 communicates with the server 102 via a communications network, such as the Internet. The controller 210 includes a positioning device 212 that can receive and transmit position data to the controller 210. The location of the vehicle 200 at any given time can be determined by the positioning device 212 or another appropriate positioning system. Examples of such positioning devices 212 include GPS systems and devices. The vehicle controller 210 further includes a surroundings detection system 214 configured to detect the surroundings of the vehicle 200 by appropriate detection systems such as radar, laser light, GPS, odometry, computer vision, etc. The controller 210 is configured to interpret location, surroundings, and other sensory information to identify appropriate navigation paths, as well as obstacles and relevant driving information, and output control signals to a propulsion system 216 that includes appropriate components (energy, propulsion, transmission, steering, etc.) for driving the vehicle 200.

Figure 3:
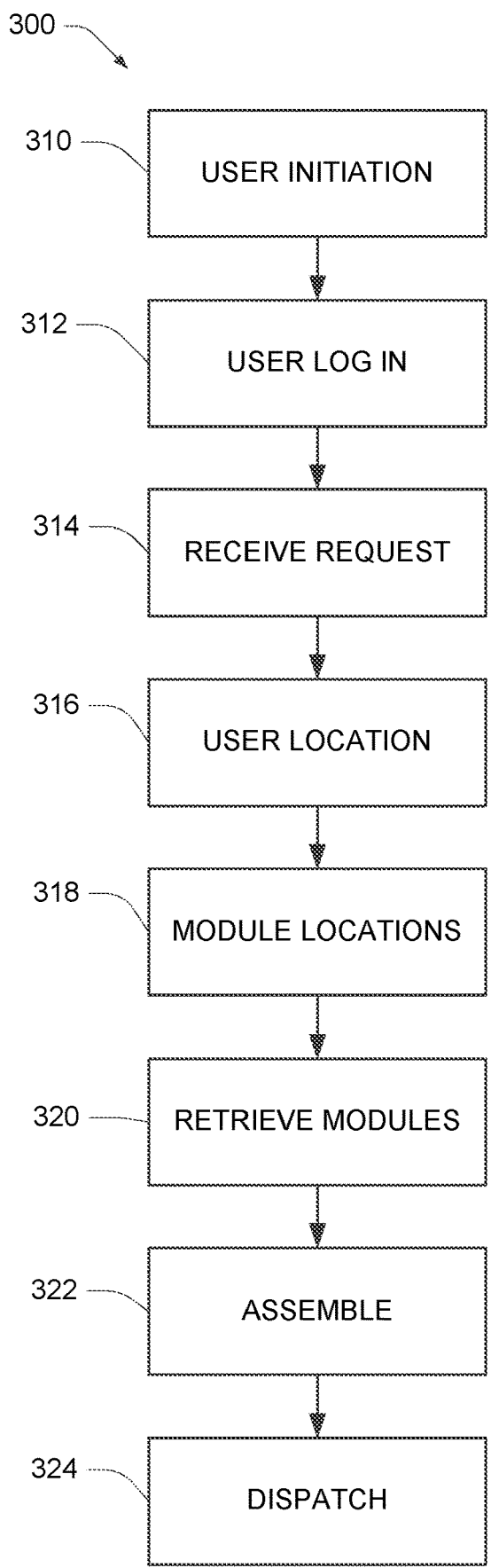
FIG. 3 is a process flow diagram illustrating a modular vehicle configuration system method by the system shown in FIG. 1.

Via the user interface 120, the vehicle configuration system 104 receives a request from a user specifying a desired vehicle. FIG. 3 is a flow diagram illustrating an example of a vehicle configuration process 300 implemented by a system such as that illustrated in FIG. 1. In operation 310 a user of the system connects to the server 102 of the system 100, e.g., by downloading and executing a software application ("app') onto their user device 122. The user sets up a user account 106 stored in a user account database of the system 100. The user account 106 establishes settings, permissions, payment authorizations, and other information about the user and vehicle preferences. Authentication credentials such as a login name and password, security questions and answers, biometrics information, etc., can be established to mitigate the chances of unauthorized access to the system 100 through the user's account. The user account is linked to at least one financial account of the user (e.g., a credit card account or bank account). Additionally, the user account can set permissions that link/provide access of the server 102 to one or more information sources such as a positioning device on the user device 122, providing the location of the user.

In addition, the user account 106 can include a profile that describes how the intends to use requested vehicles, including transporting passengers, specifying any special transportation needs of passengers (e.g. child seats, persons with disabilities access, etc.), personal or business use, cargo transportation requirements, etc. In operation 312, the user logs into their user account via the user interface 120.

At operation 314, the server 102 receives a user request via the user interface 120 specifying required vehicle modules. In operation 316, the user location is determined and in operation 318, the location(s) of the specified modules are determined. The user location could be, for example, the location of the user as determined by a positioning device on the user 122, such as a GPS location system on the user's mobile phone. Alternatively, for example, the user location could be location specified by the user via the user interface 120, such as a location where the user wants to be picked up. The specified modules are retrieved as shown in operation 320. As will be discussed further below, if the requested modules are located at multiple locations, the module selected for the user may be determined based on its proximity to the user. The specified modules are assembled into a configured vehicle at operation 322, and the configured vehicle is dispatched to the user location in operation 324.

Typically, the user request includes at least one passenger module. Depending on how many passengers are to be transported, one or more passenger modules could be requested by the user. In some example systems, for purposes of economy, the vehicle modules are relatively small. For instance, the base passenger modules are configured to comfortably transport one or two passengers. Additionally, in some embodiments, all of the vehicle modules have a common sized chassis for ease of storage, maintenance, etc. To increase capacity for additional passengers, cargo, etc., multiple modules are assembled together to configure a modular vehicle.

FIG. 4 conceptually illustrates an example of a configured vehicle 240 that includes only single passenger module 242. For example, if the user is traveling alone, they could request a single passenger module 242. Additionally, an optional storage compartment 244 may be provided, in which personal belongings of the user may be stored. In effect, the storage compartment 244 functions as a personal "glove box" for the user. Thus, the received user request may include a request to include the storage compartment 244. An inventory of the personal items may be maintained in the user account 106, and in some instances, users may have multiple storage compartments 244 specified in their user accounts 106. For example, the storage container 242 could include personal belongings such as sun glasses, lip balm, entertainment items, etc. Moreover, a "commuting" storage container could include items required for trips to and from work, and a "recreation" storage container could include recreational items. Still further, in some implementations, the server 102 is configured to learn the user's behaviors, and replenish items stored in the storage containers 244 automatically. The location of the user's storage container(s) 244 may be maintained in the user account 106, and included with the requested vehicle modules as part of the assembly process.

If additional passengers are to be transported, additional passenger modules may be requested and assembled into a configured vehicle. This is shown in FIG. 5, where two passenger modules 242 are assembled into a configured vehicle. 240a. Since each of the vehicle modules is an autonomous vehicle, the modules are capable of transporting themselves to various module storage locations if necessary for assembly into a configured vehicle. In some embodiments, the user may include further specifications regarding the passenger modules 242 in the request, such as including child seats or special provisions for persons with disabilities. In this manner, it may be insured that children are transported in proper child seats, for example, and it is not left to the user to provide such child seats.

If the user desires to transport cargo, the necessary modules are requested via the user interface 120. FIG. 6 illustrates an example where a single passenger module 242 is combined with a single cargo module 240 to form a configured vehicle 240b. In this manner, the user's requirements for transporting passengers as well as cargo are met. If both additional passengers and additional cargo transportation is required, the user's request would reflect this. FIG. 7 illustrates and example of a configured vehicle 240c that includes two passenger modules 242 and two cargo modules 250.

Cargo modules 250 may be further configured for transporting different kinds of cargo. For example, some cargo modules 250 could include refrigeration for transporting perishable items, while others may include specialized padded compartments for transporting delicate or breakable items.

In some examples, once the required vehicle modules are located and joined together, the controllers 210 of the respective modules communicate with one another, and based on predefined rules, one controller 200 is designated as the master controller, which controls the functions of each module of the configured vehicle. In some embodiments, the controller 210 of the passenger module in which the user is transported is designated as the master controller.

Figure 8:
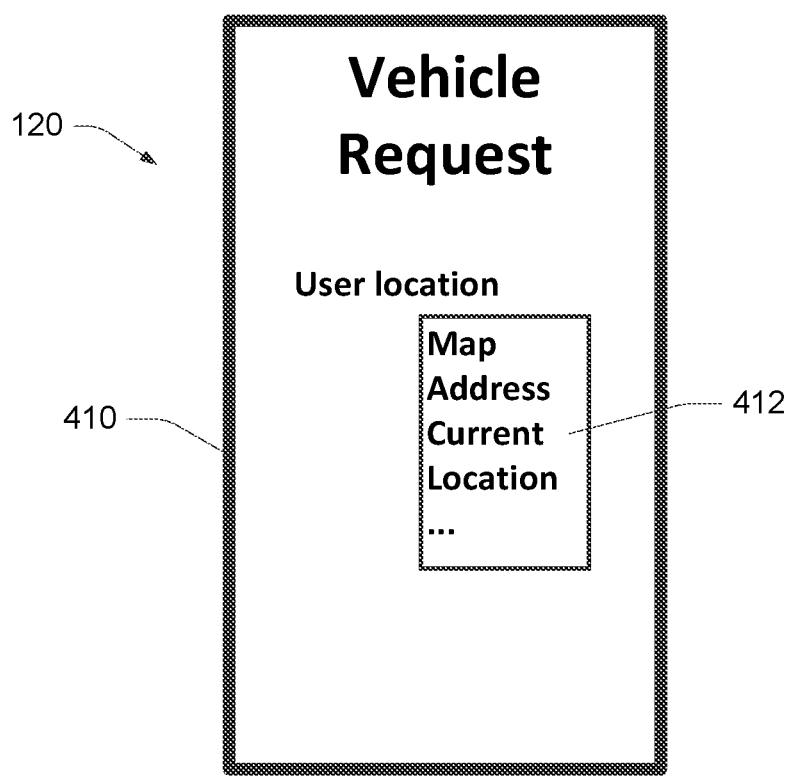
FIG. 8 illustrates an example of a user interface for receiving portions a vehicle request.
Figure 9:
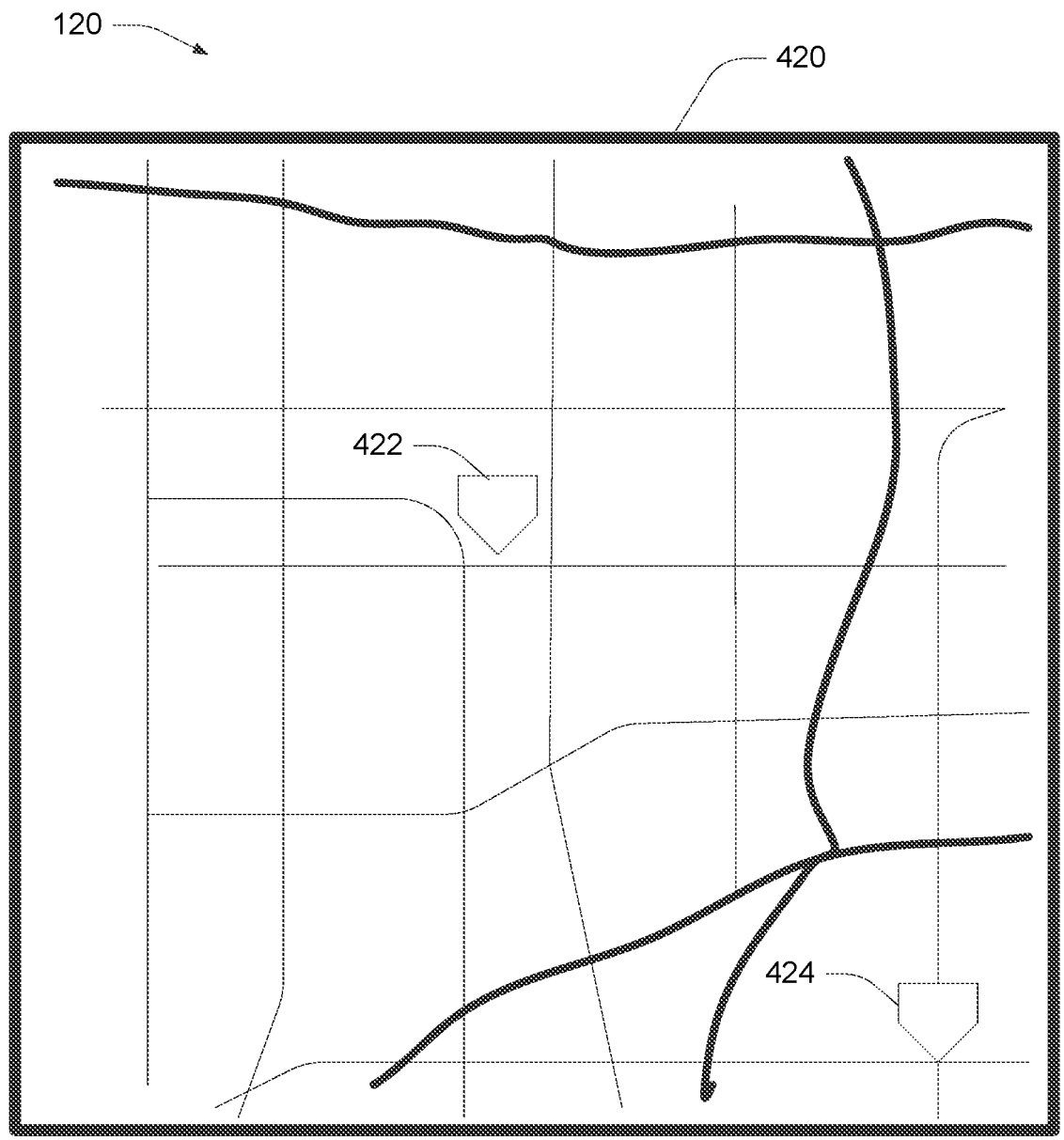
FIG. 9 illustrates an example of a map user interface for receiving portions a vehicle request.

FIG. 8 illustrates an example of the user interface 120 by which a user may request a configured vehicle. After logging in, the user may specify the user location on a location screen 410. For example, the user may elect to select a location on a map, provide an address, use the location of the user device 122, etc. as shown in a location menu 412. If the user selects the map option, a map of the area surrounding the location of the user device 122 is displayed, an example of which is shown in FIG. 9. The user may then select the user location 422—the location to which the configured vehicle will be dispatched—using the map display 420. Additionally, the map display 420 is configured in some embodiments to receive the a destination address 424. However, the destination address could be provided as part of the initial request process, or could be set by the user upon arrival of the configured vehicle at the user location 422.

Figure 10:
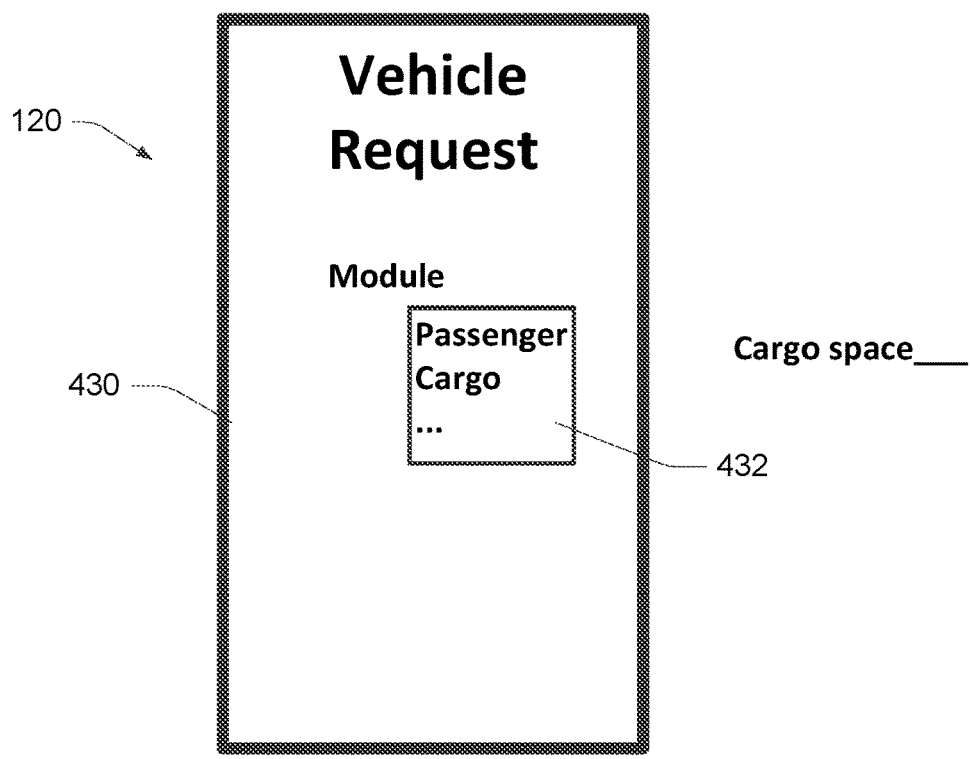
FIG. 10 illustrates another example of a user interface for receiving portions a vehicle request.
Figure 11:
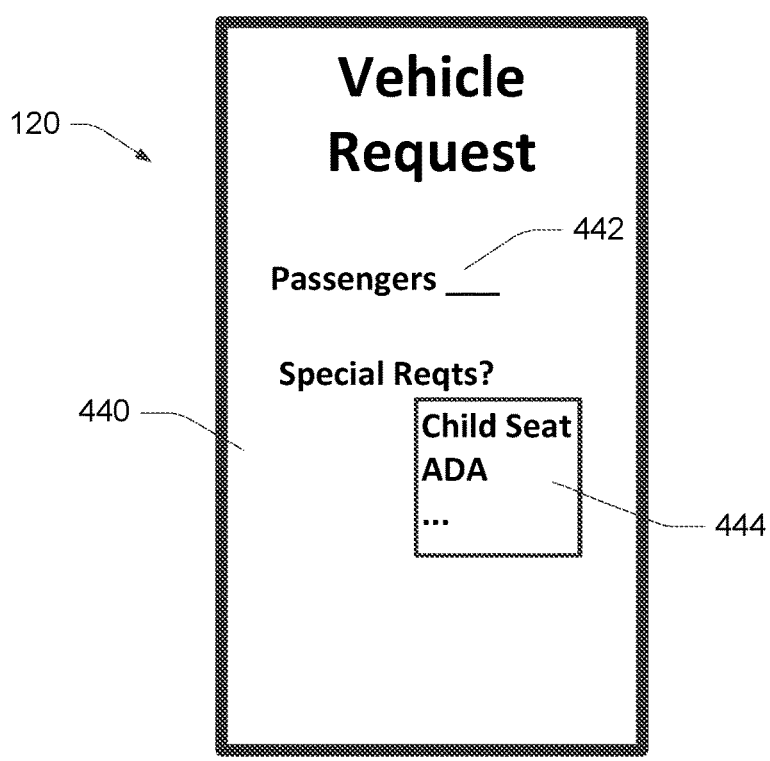
FIG. 11 illustrates another example of a user interface for receiving portions a vehicle request.

FIG. 10 illustrates another user interface screen 430 by which the user may select desired vehicle modules. For example, the user may select among various types of modules in a menu box 432. In response to selecting a passenger module, another screen 440 shown in FIG. 11 is displayed, by which the user may specify further details regarding the passenger module, such as the number of passengers at an input 442, special requests such as child seats or disability access, etc. using a menu box 444. In some examples, the vehicle configuration system 104 is configured to determine the number of passenger modules necessary based on the number of passengers and/or special requests specified.

Figure 12:
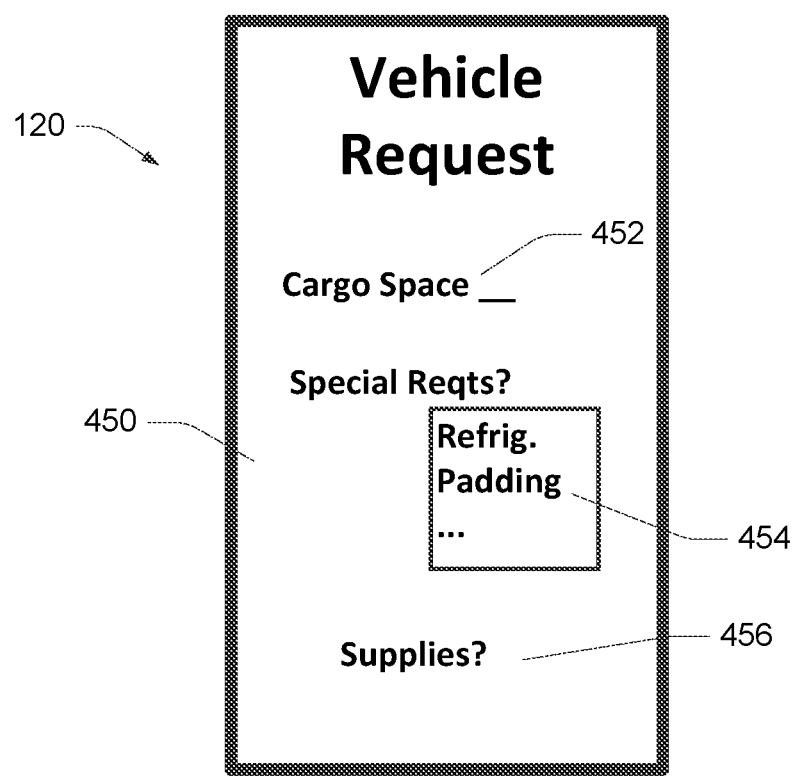
FIG. 12 illustrates another example of a user interface for receiving portions a vehicle request.

Referring back to FIG. 10, in response to the user specifying one or more cargo modules, another input screen 450 is displayed as shown in FIG. 12. The user is prompted to enter a measure of the cargo space necessary in an input 452. This could be in the form of cargo area required (e.g. cubic feet or meters), number and size of items to be transported, etc. The illustrated example screen 450 also allows the user to enter special cargo requests, such as refrigeration, special padding or other packing, live animals, etc.

In some implementations, warehouse or storage space for personal or business items is provided. For example, this could be used for storing business supplies or inventory. Information regarding such storage, such as the types of stored items and storage location could be stored in the user profile 106. An input 456 allows the user to request pick up and transport of supplies. Thus, once the required vehicle modules are assembled into the configured vehicle, the server 102 could dispatch the configured vehicle from the vehicle location to the supply location to pick up the specified supplies and load them into one or more cargo modules, and then the loaded vehicle could be dispatched to the user location.

Figure 13:
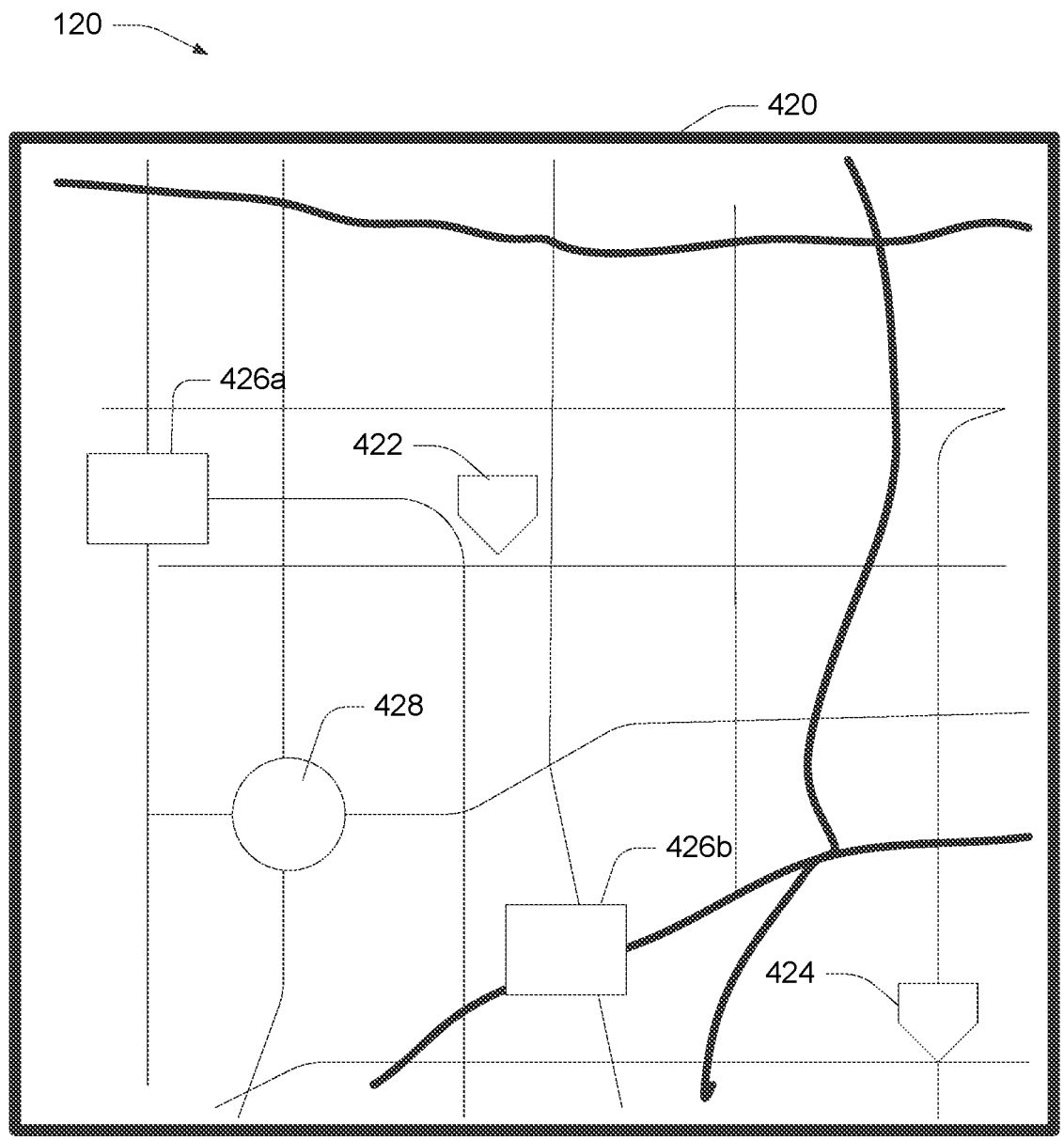
FIG. 13 illustrates an example of another map user interface for receiving portions a vehicle request.

Once the user has finished using the configured vehicle, is may be returned to the vehicle location from which the configured vehicle was dispatched, or depending on the location of the configured vehicle when the user is finished using the vehicle, to another closer location. FIG. 13 displays the map user input screen 420 shown in FIG. 9, with two vehicle staging locations 426a, 426b shown in addition to the original user location 422 and the user destination location 424. In the illustrated example, the vehicle location is at location 426*a*—the location from which the configured was dispatched to the user location 422. Since the location 426*b* is closer to the user destination location 424, the server 102 may output instructions for the configured vehicle to automatically proceed to the location 426*b*, where the modules are separated, and then stored for the next user. In other implementations, different staging locations store different types of modules. Thus, if passenger modules are stored at location 426*a*, and cargo modules are stored at 426*b*, the server 102 could instruct the configured vehicle to automatically proceed to location 426*b*, where the cargo module(s) would be separated from the configured vehicle and stored, then the remaining passenger module(s) would continue to location 426*a*.

Still further, if the cargo modules still include user supplies after the user has finished using the configured vehicle, the user could specify via the user interface 120 the cargo modules be dispatched to a storage location 428. Upon reaching the storage location, the supplies are removed from the cargo module(s) and appropriately stored. The cargo module(s) would then be dispatched to an appropriate location (e.g. location 426*a* or 426*b*) for disassembly and storage.

Figure 14:
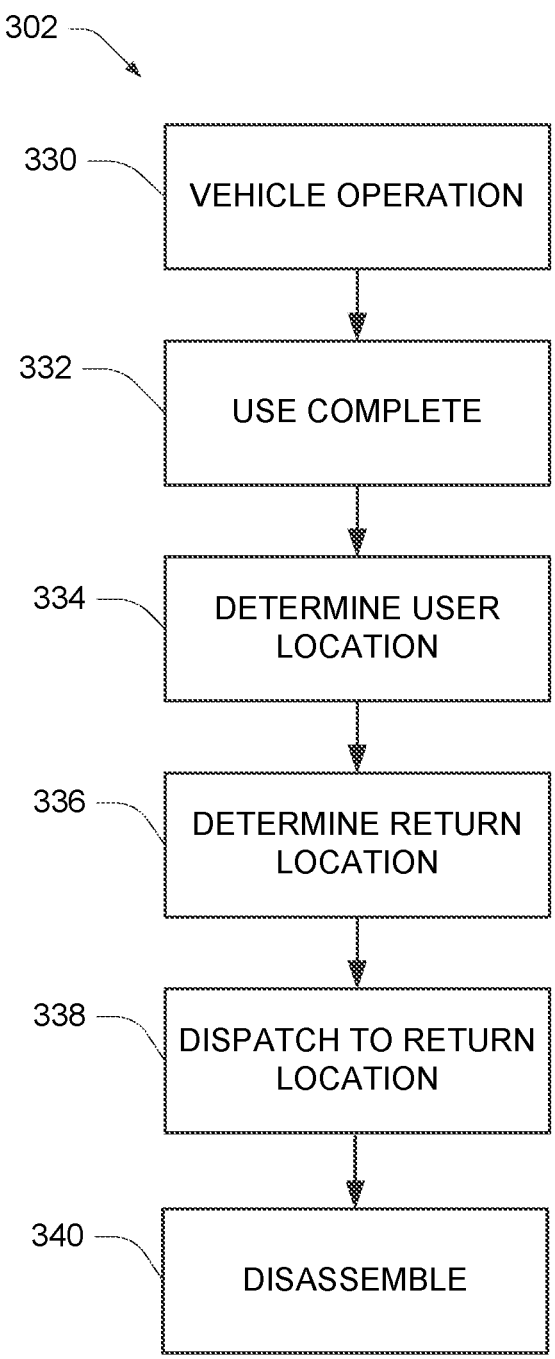
FIG. 14 is a process flow diagram illustrating further aspects of the modular vehicle configuration method shown in FIG. 3.

FIG. 14 is a process flow diagram illustrating a process 302 that continues the example process 300 shown in FIG. 3. The user operates the configured vehicle as desired as shown in process 332. When vehicle use is complete, the user may provide such an indication via the user interface 120, which is received by the server 102. In operation 334, the user location is determined based on an input received via the user interface 120. The user location could be, for example, the location of the user as determined by the positioning device on the user 122, such as a GPS location system on the user's mobile phone. Alternatively, for example, the user location could be location specified by the user via the user interface 120, such as by selecting a location on a map display or entering an address.

The location to which the configured vehicle is to be returned is determined by the server 102 in operation 338. As noted above, the return location could actually be multiple locations, depending on desired locations for storing various modules, supplies, personal storage compartments, etc. Further, return location(s) may be determined based on the user location. For example, it may be desirable to return the configured vehicle to the location closest to the user location.

In operation 338, the configured vehicle is dispatched from the user location to the return location. Since the configured vehicle is an autonomous or self-driving vehicle, it is returned to the return location without the need for a driver. Upon reaching the return location(s), the modules making up the configured vehicle are returned to their proper storage locations in operation 340.

Consider an example where an individual operates a home-based catering business. If the business owner lives in a small apartment, it is likely they have little space to store a vehicle, catering equipment and supplies, etc. The system 100 shown in FIG. 1 and disclosed herein would be particularly useful for such an individual. For a catering job, the user could request a vehicle using the user interface 120. Following the process illustrated in FIG. 3, the user logs in and specifies necessary vehicle modules and supplies. If employees will be working with the business owner, sufficient passenger modules are specified. Additionally, cargo modules could be specified, as well as catering equipment and inventory stored in one or more storage locations. The user could specify inventory rules stored in the user account 106, instructing the server to order supplies as necessary. If some of the food inventory is perishable, refrigerated storage modules could be specified.

The modules are assembled into a configured vehicle and attached to the proper user location, from which the user and passengers are transported to the catering site. Once the catering equipment and supplies are unloaded, the configured vehicle could be moved to the closest vehicle storage location as determined by the server 102. When the catering job is complete, the vehicle automatically returns to the job site to pick up the passengers and equipment. Once the passengers have been returned to their desired location(s), the vehicle is dispatched to the determined return location for disassembly.

Figure 15:
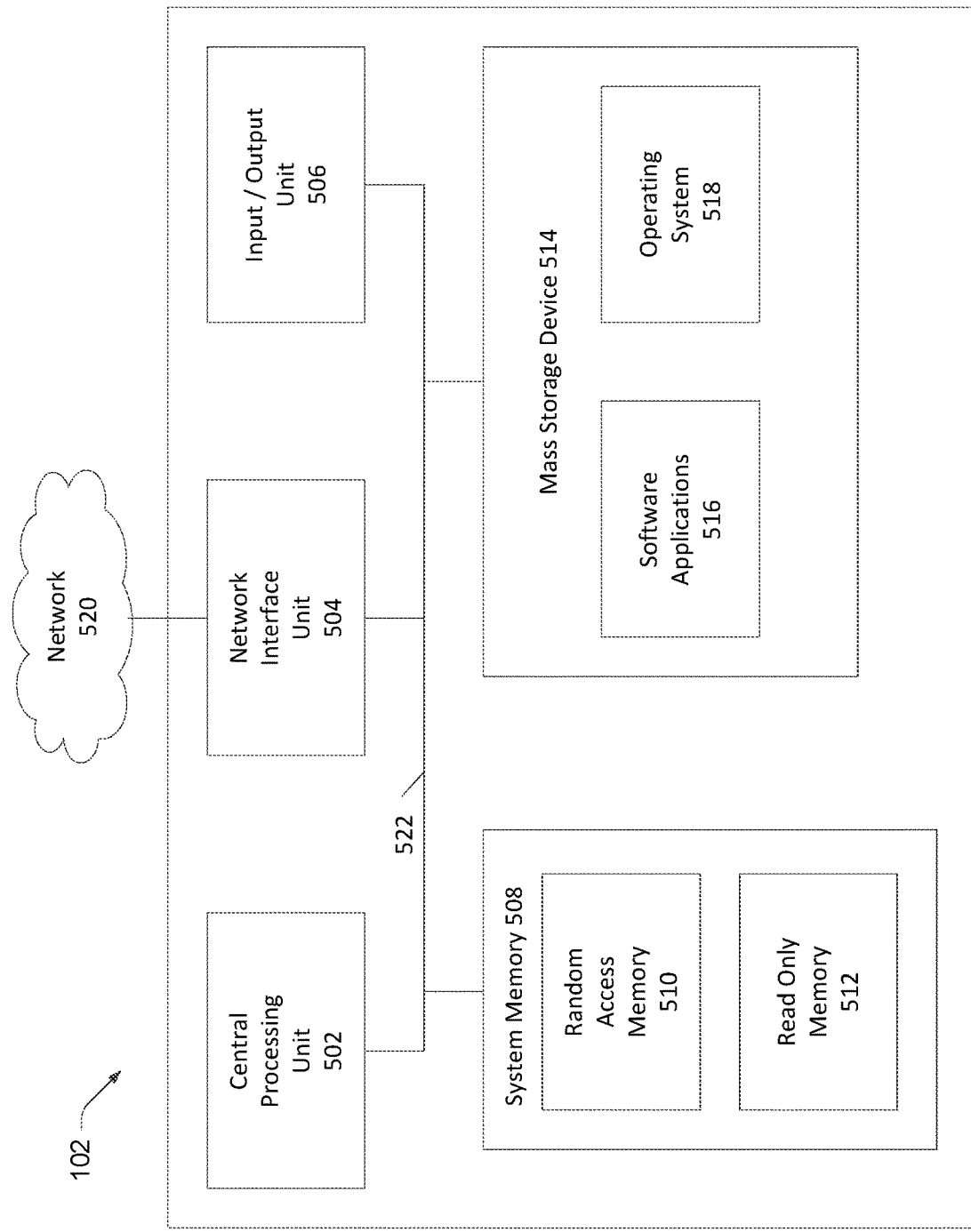
FIG. 15 a block diagram illustrating portions of an example computer system.

FIG. 15 schematically illustrates an example of the computer 102, which could be a server computer as discussed above. The computer 102 includes at least one processor ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 102, such as during startup, is stored in the ROM 512. The server computer 102 further includes a mass storage device 514. The mass storage device 514 is able to store software instructions and data. As noted above, the user accounts 106 could be stored in a database implemented by the mass storage device 512, and could further include additional databases implemented by other computer systems accessible by the server 102. A processor, system memory and mass storage device similar to that in FIG. 15 are also included in each of the devices 122 providing the user interfaces 120.

The mass storage device 514 is connected to the CPU 502 through a mass storage controller (not shown) connected to the system bus 522. The mass storage device 514 and its associated computer-readable data storage media provide non-volatile, non-transitory storage for the server computer 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the server computer 102 may operate in a networked environment using logical connections to remote network devices through the network 520, such as a wireless network, the Internet, or another type of network. The server computer 102 may connect to the network 520 through a network interface unit 504 connected to the system bus 522. It should be appreciated that the network interface unit 504 may also be utilized to connect to other types of networks and remote computing systems. The server computer 102 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the server computer 102 can store software instructions and data. The software instructions include an operating system 518 suitable for controlling the operation of the server computer 102. The mass storage device 514 and/or the RAM 510 also store software instructions, that when executed by the CPU 502, cause the server computer 102 to provide the functionality of the server computer 102 discussed in this document. For example, the mass storage device 514 and/or the RAM 510 can store software instructions that, when executed by the CPU 502, cause the server computer 102 to implement the analysis engine 104 and the rules engine 106 shown in FIG. 1 for applying the various processes described herein, among other things.

Although various embodiments are described herein, those of ordinary skill in the art will understand that many modifications may be made thereto within the scope of the present disclosure. For instance, examples related to home loans are included herein, though the disclosed systems and methods are also applicable to many other financial processes, such as personal and business loans, credit card accounts, home equity lines of credit, mortgage refinances, etc. Accordingly, it is not intended that the scope of the disclosure in any way be limited by the examples provided.

What is claimed is:

1. A vehicle system, comprising:
 a plurality of vehicle modules, each with a controller, the plurality of vehicle modules including at least one autonomous vehicle module, at least one passenger module, and at least one cargo module, wherein each passenger module includes an autonomous vehicle;
 a processor;
 a memory accessible by the processor storing program instructions that configure the processor to:
 generate a user interface;
 receive a personalized vehicle rental request for a re-configurable rental vehicle from a user located at a user location via the user interface, the personalized vehicle rental request specifying a plurality of the vehicle modules, including:
  a number of passengers, the number of passengers defining a number of passenger modules to include with the re-configurable rental vehicle to accommodate the passengers; and
  an amount of cargo, the amount of cargo defining a number of cargo modules to include with the re-configurable rental vehicle to accommodate the cargo;
 determine the user location;
 determine a module location for each specified vehicle module, including the passenger modules and the cargo modules;
 based on the personalized vehicle rental request, output configuration instructions for retrieving the specified modules from the module locations based on the proximity to the user location, and assemble the specified modules into the re-configurable rental vehicle, wherein:
  the controller of each respective vehicle module communicates with one another and designates a master controller which controls the re-configurable rental vehicle; and
  the re-configurable rental vehicle is located at a dispatch location;
 assemble the re-configurable rental vehicle based upon the configuration instructions, including coupling each of the passenger modules and the cargo modules to form the re-configurable rental vehicle; and
 dispatch the re-configurable rental vehicle from the dispatch location to the user location.

2. The system of claim 1, further comprising supplies stored at a storage location, and wherein the program instructions further configure the processor to, based on the personalized vehicle rental request, dispatch the re-configurable rental vehicle to the storage location to pick up supplies.

3. The system of claim 2, wherein the supplies include user items stored by the user, and wherein and assembling the specified modules includes loading the user items into the re-configurable rental vehicle.

4. The system of claim 1, further comprising supplies stored at a storage location, wherein the program instructions further configure the processor to, based on the personalized vehicle rental request, dispatch the re-configurable rental vehicle to the storage location to load the supplies into the cargo modules.

5. The system of claim 1, wherein the program instructions further configure the processor to, based on the personalized vehicle rental request, return the vehicle to the dispatch location.

6. The system of claim 1, wherein the program instructions further configure the processor to disassemble the re-configurable rental vehicle and return the modules to the module locations.

7. A computer implemented method, comprising:
 generating a user interface;
 receiving a personalized vehicle rental request for a re-configurable rental vehicle from a user located at a user location via the user interface, the personalized vehicle rental request specifying a plurality of vehicle modules, each with a controller, the plurality of vehicle modules including at least one autonomous vehicle module, at least one passenger module, and at least one cargo module, wherein each passenger module includes an autonomous vehicle, including:
  a number of passengers, the number of passengers defining a number of passenger modules to include with the re-configurable rental vehicle to accommodate the passengers; and
  an amount of cargo, the amount of cargo defining a number of cargo modules to include with the re-configurable rental vehicle to accommodate the cargo;
 determining a user start location;
 determining a module location for each specified vehicle module based on the proximity to the user location, including the passenger modules and the cargo modules;
 based on the personalized vehicle rental request, outputting instructions for assembling the specified modules into the re-configurable rental vehicle, wherein:

the controllers of the respective vehicle modules communicate with one another and designate a master controller which controls the functions of each module of the re-configurable rental vehicle; and the re-configurable rental vehicle is located at a dispatch location;

assembling the re-configurable rental vehicle based upon the configuration instructions, including coupling each of the passenger modules and the cargo modules to form the re-configurable rental vehicle;

dispatching the re-configurable rental vehicle from the dispatch location to the user start location;

receiving an indication from the user that use of the re-configurable rental vehicle is complete;

determining a user end location; and dispatching the re-configurable rental vehicle from the user end location to the dispatch location.

8. The method of claim 7, further comprising dispatching the re-configurable rental vehicle to a storage location to pick up supplies.

9. The method of claim 7, further comprising disassembling the re-configurable rental vehicle and returning the modules to the module location.

\* \* \* \* \*